United States Patent Office 3,641,032
Patented Feb. 8, 1972

---

3,641,032
N,N-DISUBSTITUTED 2-ALKYL-3-HYDROXY-1 (2H)-ISOQUINOLONECARBAMATES
Harold Zinnes, Rockaway, John Shavel, Jr., Mendham, and Neil A. Lindo, Chatham, N.J., assignors to Warner-Lambert Company, Morris Plains, N.J.
No Drawing. Filed June 5, 1969, Ser. No. 830,882
Int. Cl. C07d 35/32
U.S. Cl. 260—287
2 Claims

ABSTRACT OF THE DISCLOSURE

Immunosuppressive compositions containing compounds of the formula:

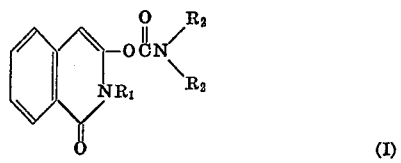

wherein $R_1$ is alkyl and $R_2$ is alkyl or aryl. Generally speaking, they are administered at a dose of about 1 mg./kg. to 100 mg./kg. of the animal body weight in order to suppress immuno responses.

---

The present invention relates to compositions of matter; and more particularly, the present invention relates to immunosuppressive compositions containing as active ingredients compounds of the formula:

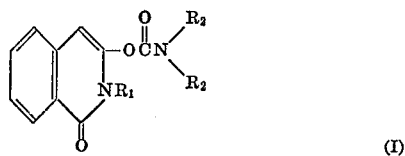

wherein $R_1$ is alkyl and $R_2$ is alkyl or aryl. In the above definition for $R_1$ and $R_2$, alkyl includes both straight and branched chain aliphatic hydrocarbons, preferably of 1 to 7 carbon atoms such as methyl, ethyl, propyl, isopropyl, butyl, isobutyl and so on; an aryl contains from 6 to 10 carbon atoms such as phenyl and tolyl.

The present invention also includes within its scope a novel method for the suppression of immuno responses by the administration, orally or by injection, of compositions containing the above compounds.

The compositions of this invention when administered to a mammalian host, such as guinea pigs, dogs, cats, monkeys, mice, rats and the like, exhibit immunosuppressive properties. For example, at a daily i.p. dose of 100 mg./kg., 2-ethyl-3-hydroxy-1(2H)-isoquinolone diphenylcarbamate selectively suppressed a hypersensitivity reaction to bacterial endotoxin, without inhibition of the early aspects of antibody formation. The conditions to which these compositions are indicated are for example, rheumatoid arthritis, ulcerative colitis, allergies, skin and organ transplants, systemic lupus, glomerular nephritis and the like.

Generally speaking, a dose level of 1 to 100 mg./kg. of the animal body weight, administered orally or by injection, two or three times daily, is recommended to treat the above-described conditions, and the dosage regimen may be varied according to the severity of the condition being treated, the age, sex, body weight and the species of the animal involved.

According to the present invention, the compounds are prepared by reacting a compound of Formula II (below) with a carbamylhalide of Formula III (below) in the presence of a base such as sodium hydride in a solvent such as dimethylformamide. X is a halogen.

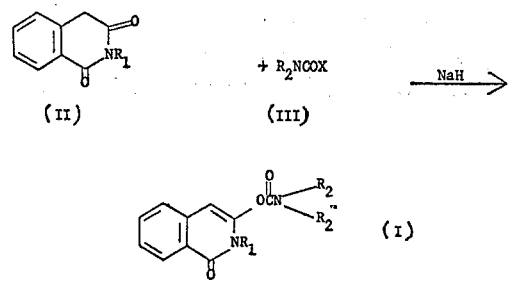

The above-mentioned oral compositions or parenteral compositions may optionally contain small amounts of such agents which are commonly used to facilitate manufacture and maintain the efficacy of aqueous dispersions, for example, wetting or dispersing agents and suspending agents, and the like.

The following examples are included in order to further illustrate the invention.

EXAMPLE 1

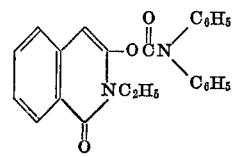

2-ethyl-3-hydroxy-1(2H)-isoquinolone diphenylcarbamate

To a suspension of 0.055 mole of sodium hydride in 50 ml. of dimethylformamide is added 9.5 g. (0.05 mole) of N-ethylhomophthalimide. The reaction mixture is stirred at room temperature for one hour and a solution of 11.6 g. (0.05 mole) of diphenylcarbamyl chloride in 25 ml. of dimethylformamide is added. It is stirred at room temperature for 1.5 hours, is heated at 140° for 15 minutes, allowed to stand overnight at room temperature, and poured into ice water containing excess ammonium chloride. The resulting precipitate is collected, dissolved in dichloromethane, and the dried solution is evaporated to give a solid residue which is charcoaled and recrystallized from methanol to give 8 g. of crystalline product, M.P. 147–149° dec.

*Analysis.*—Calcd. for $C_{24}H_{20}N_2O_3$ (percent): C, 74.98; H, 5.24; N, 7.29. Found (percent): C, 75.25; H, 5.29; N, 7.46.

EXAMPLE 2

| Treatment: | No. anti-forming cells per spleen |
|---|---|
| None | 10 |
| SRBC, only | 265 |
| SRBC+2-ethyl-3-hydroxy-1(2H) - isoquinolone diphenylcarbamate | 300 |
| Endotoxin, only | 180 |
| Endotoxin+2-ethyl-3 - hydroxy - 1(2H) - isoquinolone diphenylcarbamate | [1]110 |

[1] Different from 180.

Dose: 100 mg./kg.
Route: i.p. } administered once daily

This increase in number of cells producing antibody caused by endotoxin is a hypersensitivity response of the delayed type and is inhibited by the subject compound.

We claim:
1. A compound of the formula:
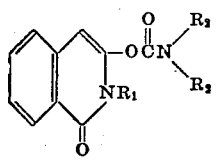
(I)
in which $R_1$ is lower alkyl and $R_2$ is lower alkyl, phenyl or tolyl.
2. A compound according to claim 1 which is 2-ethyl-3-hydroxy-1(2H)-isoquinolone diphenylcarbamate.
References Cited
UNITED STATES PATENTS
| | | | |
|---|---|---|---|
| 2,449,440 | 9/1948 | Aeschcimann | 260—287 X |
| 2,785,159 | 3/1957 | Hoffman | 260—288 X |
| 3,005,823 | 10/1961 | Kaeding | 260—287 |
| 3,362,960 | 1/1968 | Hodel | 260—287 |
| 3,376,307 | 4/1968 | Hyden | 260—287 X |
| 3,538,099 | 11/1970 | Rohr et al. | 260—287 |
DONALD G. DAUS, Primary Examiner
U.S. Cl. X.R.
260—281; 424—258